United States Patent [19]

Thompson et al.

[11] Patent Number: 5,626,729

[45] Date of Patent: May 6, 1997

[54] MODIFIED POLYMER ELECTRODES FOR ENERGY STORAGE DEVICES AND METHOD OF MAKING SAME

[75] Inventors: Lillian C. Thompson, Buffalo Grove; Changming Li, Vernon Hills; Ke K. Lian, Northbrook, all of Ill.

[73] Assignee: Motorola, Inc., Schaumburg, Ill.

[21] Appl. No.: 586,618

[22] Filed: Feb. 1, 1996

[51] Int. Cl.$^6$ ............................................. C25B 9/00
[52] U.S. Cl. ................ 204/252; 204/242; 204/290 R; 361/503; 361/508; 361/509; 361/516; 361/523; 361/524; 361/526; 361/528; 361/532; 429/213; 429/218; 429/122
[58] Field of Search ........................... 204/290 R, 242, 204/252; 361/503, 508, 509, 516, 523, 524, 526, 528, 532; 429/218, 213, 122

[56] References Cited

U.S. PATENT DOCUMENTS 4,492,743 1/1985 Howe ..................... 204/290 R

OTHER PUBLICATIONS

J. Electrochem Soc. vol. 140, No. 10 "A Simple Chemical Procedure for Extending the Conductive State of Polypyrole to More Negative Potentials", Dyke, et al, pp. 2754–2759.

*Primary Examiner*—Bruce F. Bell
*Attorney, Agent, or Firm*—Kenneth M. Massaroni

[57] ABSTRACT

Method for making high power electrochemical capacitors (28) provides for depositing an electrically polymer (18) and (20) onto a substrate (12) which has been treated so as to form nitride layers (14) and (16) on exposed surfaces thereof. Such electrochemical capacitors provide for high power high energy devices without the short comings of excessive equivalent series resistance nor the expense of noble metal substrates as have been typically been used.

16 Claims, 4 Drawing Sheets

MODIFIED POLYMER ELECTRODES FOR ENERGY STORAGE DEVICES AND METHOD OF MAKING SAME

TECHNICAL FIELD

This invention relates in general to electrochemical charge storage devices, and in particular to high energy density, high power density, polymer electrodes for such devices.

BACKGROUND

As electronic devices increasingly become portable, advances must be made in energy storage devices so as to enable such portability. Indeed, it is often the case with current electronics technology that the limiting factor to portability of a given device is the same size and weight of the associated energy storage device. Obviously a small energy storage device may be fabricated for a given electrical device, but at the cost of energy capacity. The result is either that the energy source is too bulky, too heavy, or does not last long enough for a given application. The main energy storage device used for portable electronics today is the electrochemical battery cell, and increasingly the electrochemical capacitor.

Electrochemical capacitors are a class of devices characterized by relatively high power densities as compared with conventional battery systems. The charge mechanism of electrochemical capacitors is typically the result of primary, secondary, tertiary and higher order oxidation/reduction reactions between the electrodes and the electrolyte of the capacitor.

Heretofore, such devices have typically been made of electrodes fabricated of relatively exotic or expensive materials such as ruthenium. Electronically conducting polymers represent a promising class of materials for the development of electrochemical capacitors; common examples of such polymers include polypyrrole and polyaniline. High specific capacitance may be obtained in these materials by doping the polymer via an oxidation/reduction reaction. The simplest such devices are symmetric capacitors in which both the anode and cathode are fabricated of the same conducting polymer. Devices with different or asymmetric electrodes are also possible.

One of the major limitations to the economical fabrication of polymer electrochemical capacitor devices is the requirement that such devices be fabricated with noble metal substrates upon which the polymer electrodes are deposited. Such noble metal substrates are extremely costly, and thus, substantially increase the expense of fabricating polymer electrodes for electrochemical cells. Noble metals are necessary as the substrates upon which to deposit polymers since only they provide the adherence between the polymer and the substrate necessary in order to provide a device with long cycle life.

Carbon based materials have also been used as substrates for the deposition of electrically conducted polymers for electrochemical capacitor devices. Carbon, while cheaper than noble metals, such as gold and platinum, results in higher equivalent series resistance ("ESR") than in noble metal substrates. High ESR yields an energy storage device which cannot provide the high energy and power levels required of most capacitor devices.

Accordingly, a method by which the use of non-noble metals and non-noble metal alloy foils would be preferred to simplify the manufacturing processes, particularly as compared to the carbon electrodes. This will allow fabrication costs to be reduced substantially, as well as reducing ESR. Direct electrodeposition of polymer materials onto non-noble metal and metal alloy surfaces would also decrease manufacturing steps and costs, while yielding devices which can provide the performance required.

DETAILED DESCRIPTION OF THE PREFERRED EMBODIMENTS

Figure 1:
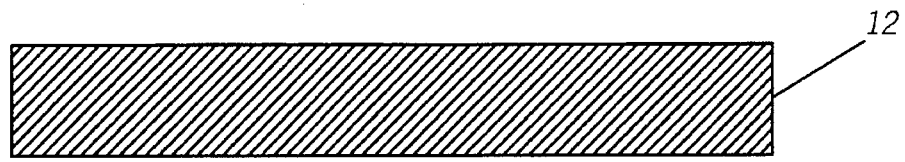
FIGS. 1–3 are a series of cross sectional side views illustrating the steps for fabricating an electrode assembly for an electrochemical capacitor device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Figure 2:
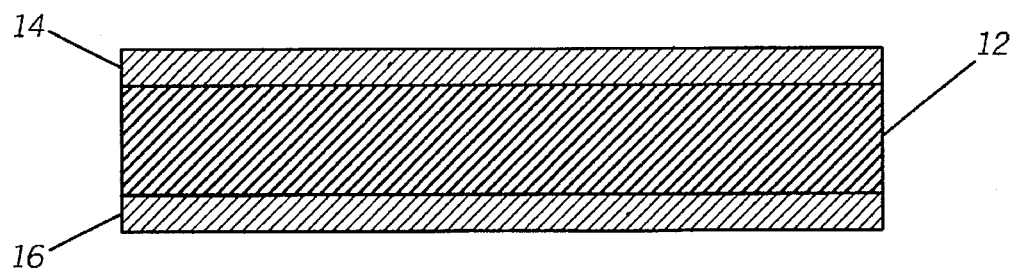
Figure 3:
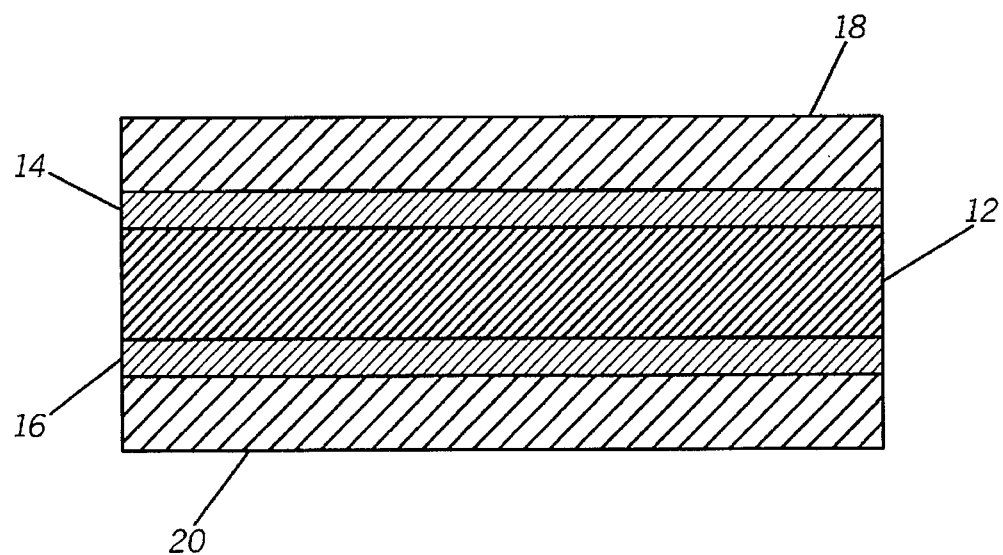

Referring now to FIGS. 1–3 there is illustrated therein the steps necessary for fabricating an electrochemical charge storage device in accordance with the instant invention. FIG. 1 illustrates the step of providing a substrate upon which the electrode for the electrochemical charge storage device is deposited. The substrate is preferably fabricated of a non-noble metal or metal alloy, examples of which include titanium, stainless steel, nickel, molybdenum, silicon, zirconium, aluminum, vanadium, niobium, chromium, tungsten, and combinations thereof. The step of providing the substrate 12 may include the further step of providing a substrate which is preferably selected from the group of titanium or stainless steel.

Thereafter, as is illustrated in FIG. 2, a nitride layer 14, 16, is formed on at least one surface of said substrate 12. As illustrated in FIG. 2, the nitride layer is formed on both the first and second major surfaces of substrate 12. In the embodiment in which the substrate 12 is titanium, the nitride layer is titanium nitride, such as $Ti_2N$, or TiN. Specifically, and as is described in greater detail hereinbelow, substrate 12, for example, a titanium substrate, is exposed to a nitrogen atmosphere at elevated temperatures for prolonged periods of time. For example, a titanium substrate may be placed in a crucible in an oven, which oven is flooded with nitrogen gas. Thereafter, the oven is heated to elevated temperatures, i.e., in excess of 450° C. for a period of time sufficient to grow a nitride layer of a desired thickness. For example, in order to grow a nitride layer of about 10 Å on a Ti substrate requires about 1–2 minutes. In one preferred embodiment, a titanium substrate is placed in an aluminum crucible and heated to 650° C. for approximately 16 hours. Thereafter the material is cooled and x-ray diffraction analysis indicates that a layer of $Ti_2N$ is formed on the exposed surfaces of the titanium substrate. The nitride layer should be fabricated to a thickness of between 10 Å and 1 μm and preferably between 50 Å and 500 Å.

Referring now to FIG. 3, there is illustrated therein the step of depositing an electrically conductive polymer on the nitride layers. Specifically, conducting polymer layers 18 and 20 are deposited upon nitride layers 14 and 16 respectively. The conducting polymers are typically redox polymers selected from the group consisting of polyaniline, polypyrrole, polyanisidene, polyparaphenylene, polythiophene, polyacetylene, polyfuran, polyazulene, polyindole, and combinations thereof. In one preferred embodiment, the electrically conducting redox polymer is polyaniline deposited to a thickness of between 50 Å and 100 μm. The electrically conducting redox polymer may be deposited by any of a number of known techniques, though it is preferably electrodeposited onto said nitride layer from aniline monomer.

Figure 4:
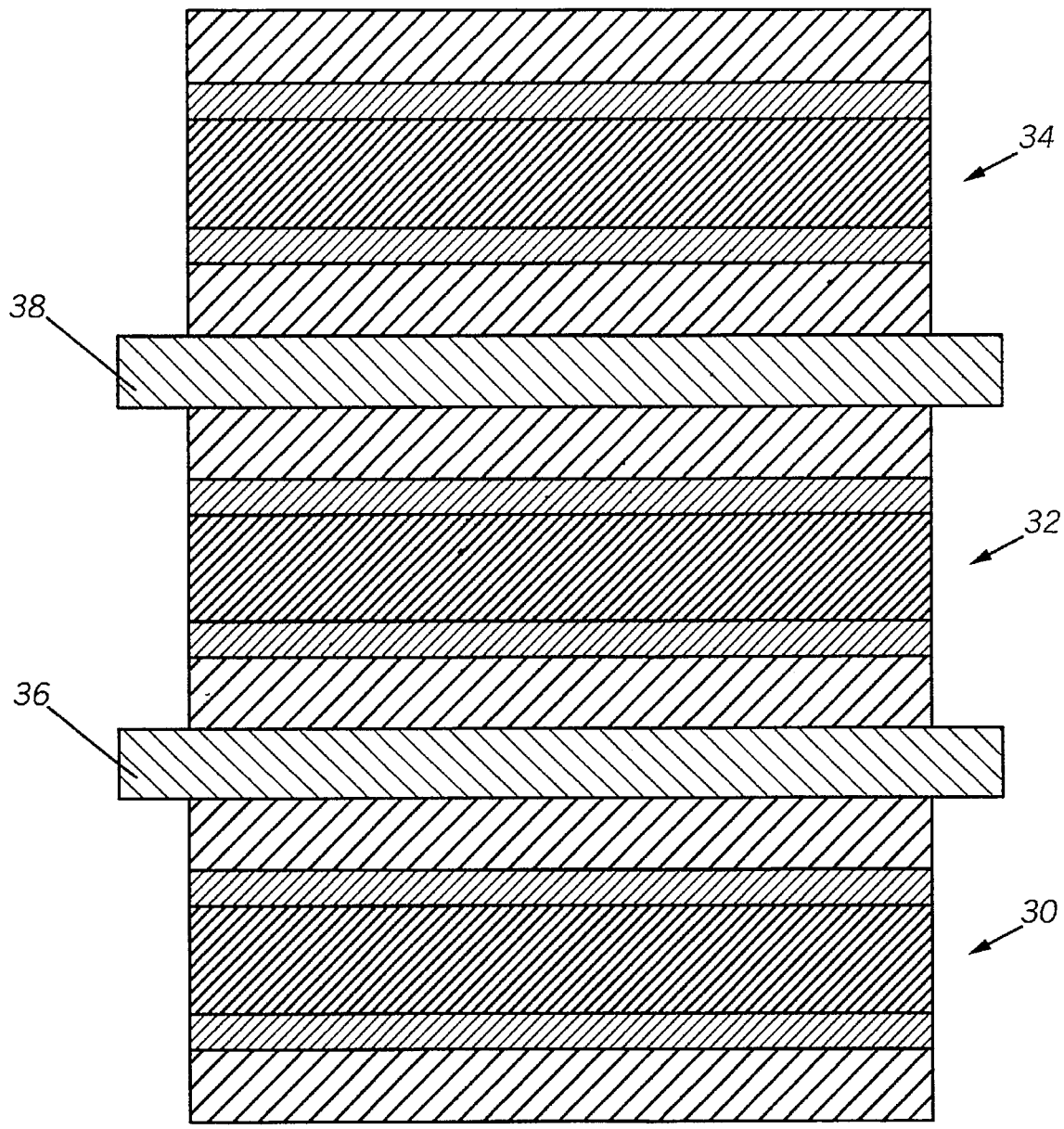
FIG. 4 is a cross sectional side view of a multi-cell electrochemical charge storage device in accordance with the instant invention.

Referring now to FIG. 4, there is illustrated therein an electrochemical charge storage device, such as an electrochemical battery or an electrochemical capacitor, 28. The electrochemical charge storage device 28 is fabricated of a plurality of electrode assemblies such as that illustrated in FIG. 3. Hence, electrode assemblies 30, 32, and 34 are each essentially identical to that illustrated with respect to FIG. 3. Disposed between said first and second electrode assemblies 30 and 32, is a first layer of an electrolyte 36. Similarly, disposed between electrode assemblies 32 and 34, is a second electrolyte layer 38. The electrolyte layers may be any of a number of electrolytes known in the prior art, examples of which include aqueous, non-aqueous, gel, solid, and polymer. In one preferred embodiment, the electrolyte layers 36 and 38 are fabricated of a polymeric matrix having an electrolyte active species dispersed therein. The polymeric matrix may be selected from the group of polymers including poly(vinyl) alcohol, polyethylene oxide, polyacrylonitrile, polyacrylimide, poly(vinylidene)fluoride, polyurethane, nafion, and combinations thereof. The electrolyte active species dispersed in said polymer matrix material may be selected from the group consisting of $H_2SO_4$, $H_3PO_4$, KOH, NaOH, HCl, KCl, NaCl, and combinations thereof. In one preferred embodiment, the electrolyte layers 36 and 38 are fabricated of polyvinyl alcohol having $H_3PO_4$ dispersed therein. While FIG. 4. illustrates only three devices in a stacked arrangement, any number of such devices can be accumulated to increase the voltage of the charge storage device. The fabrication of the devices illustrated in FIGS. 1–4, as well as the performance characteristics thereof can be better understood from the examples which follow.

EXAMPLES

Two exemplary devices were prepared using two different types of non-noble metal substrates in the fabrication of an electrochemical charge storage devices in accordance with the instant invention. The substrate materials selected were metal foils of titanium and stainless steel, each of the two materials were placed in an alumina crucible. The crucible was covered so as to limit diffusion of nitrogen gas as described hereinbelow. Samples were then each put in a furnace with a nitrogen atmosphere, which was preheated to approximately 650° C. The materials were heated at 650° C. in nitrogen for approximately 16 hours, and thereafter allowed to cool to room temperature over approximately 3 hours.

Thereafter x-ray diffraction analysis of both samples indicated the presence of a nitride layer on all exposed surfaces of both substrates. For example, a layer of $Ti_2N$ was detected by x-ray diffraction analysis on the surface of the titanium metal foil. Similarly, a nitride layer was detected on the surface of the stainless steel substrate. Thereafter ESR measurements were performed using an HP 4338A milliohm meter. Copper foil was used to cover the metal foil substrates during measurements so as to prevent damage to any surface layers. Clamps were used over the leads to ensure uniform pressure during measurement in all cases. The results of these measurements are shown in the following table.

| Material | Resistance (mOhm/cm) |
| --- | --- |
| Titanium (untreated) | 25 |
| Titanium (heat treated in oxygen) | 62 |
| Titanium (carbon coated) | 63 |
| $Ti_2N$ | 15 |
| Stainless Steel (untreated) | 44 |
| Stainless Steel (treated) | 38 |

The resistance of untreated titanium foil may be attributed to the presence of surface oxides on the foil. Heat treatment identical to that used for the nitride, except in oxygen, of the same foil caused formation of additional surface oxides resulting in yet higher resistance. Carbon coating of the titanium foil resulted in high resistance as expected. The comparatively low resistance of the $Ti_2N$ is a result of the formation of a thin nitride layer on the foil surface. Stainless steel is an alternate low cost substrate which was successfully used employing this technique. It should be noted that deposition of the conductive polymers such as polyaniline has been and may be performed on both nitride and carbide substrates. This is due to the fact that they are similar in terms of bonding preferences and hence, aniline may be initiated for electropolymerization on both nitrides and carbides. However, carbon and carbides have considerably higher resistance than nitrides and hence are not preferred as they increase ESR.

Figure 5:
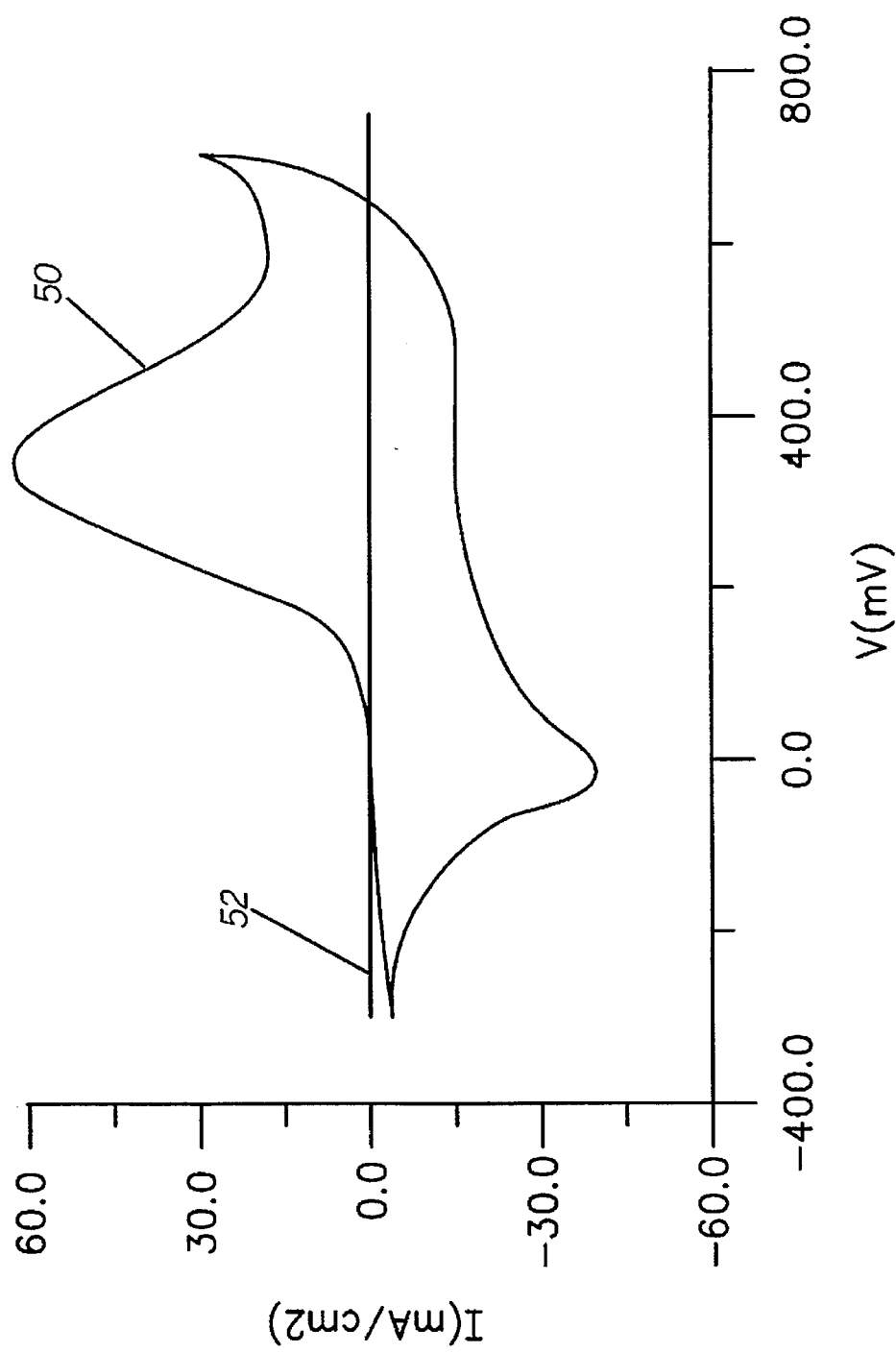
FIG. 5 is a cyclic voltammogram of a polymer coated $Ti_2N$ substrate, in accordance with the instant invention.
Figure 6:
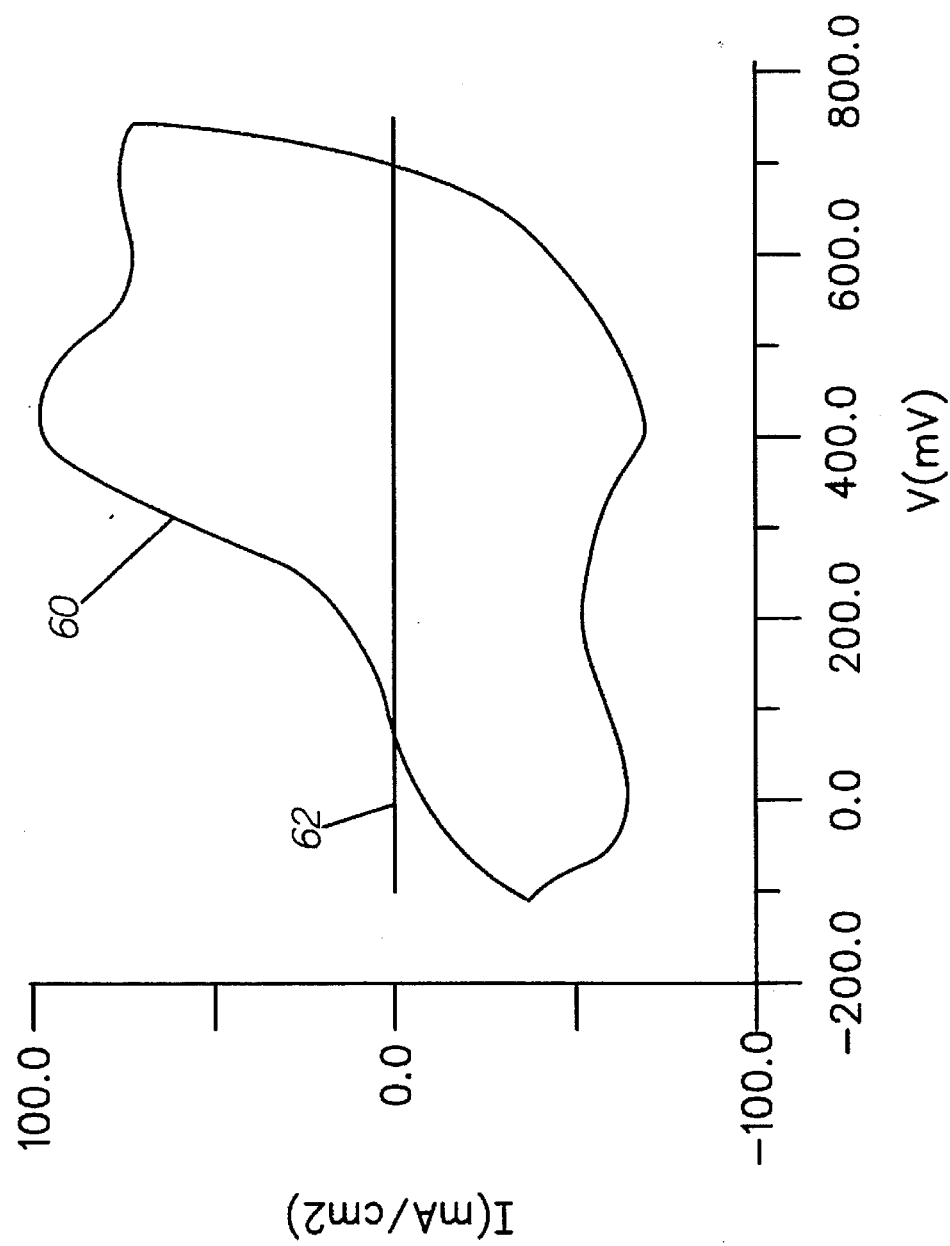
FIG. 6 is a cyclic voltammogram of a polymer capacitor device deposited on a nitrided stainless steel substrate.

Electrochemical deposition was performed on both of the substrates using cyclic voltammetry from a 0.2 molar solution of aniline and 1M $H_2SO_4$, and electrochemical measurements of the films were done in 1M sulfuric acid. Thin layers of polyaniline of between 50 Å and 5 μm, were deposited, having very good uniformity, on both sides of the substrate. Referring now to FIG. 5, there is illustrated therein the cyclic voltammogram of a polyaniline coated titanium/$Ti_2N$ substrate as compared with the titanium substrate alone. The voltammagram of the polyaniline coated titanium treated substrate is illustrated by line 50, while that of the uncoated titanium substrate is illustrated by line 52. Similarly in FIG. 6, the performance of polyaniline coated on a nitrided stainless steel substrate is illustrated by line 60, while that for the uncoated substrate is illustrated by line 62. In each example, it may be appreciated that an electrochemically active polymer coating with good adhesion properties, resulting in low ESR, are obtained using this technique. High specific capacitance can also be achieved.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode assembly for an electrochemical capacitor device comprising a titanium or stainless steel substrate having a nitride layer formed on a surface thereof, and a layer of polyaniline deposited upon said nitride layer.

2. An electrode assembly as in claim 1, wherein said nitride layer is formed to a thickness of between 10 Å and 1 μm.

3. An electrochemical cell comprising at least first and second electrodes, and an electrolyte disposed therebetween, at least one of said electrodes comprising a substrate fabricated of a material selected from the group consisting of titanium, stainless steel, aluminum, and nickel, and having a nitride layer formed on a surface thereof, and a layer of an electrically conductive polymer formed upon said nitride layer.

4. An electrochemical cell as in claim 3, wherein said first and second electrodes are the same.

5. An electrochemical cell as in claim 3, wherein said electrochemical cell is an electrochemical capacitor.

6. An electrochemical cell as in claim 3, wherein said electrochemical cell is a battery.

7. An electrochemical cell as in claim 3, wherein said nitride layer is formed to a thickness of between 0 Å and 1 µm.

8. An electrochemical cell as in claim 3, wherein said layer of conductive polymer is a redox polymer.

9. An electrochemical cell as in claim 3, wherein said wherein said layer of conductive polymer is fabricated of a material selected from the group consisting of polyaniline, polypyrrole, polyanisidene, polyparaphenylene, polythiophene, polyacetylene, polyfuran, polyazulene, polyindole, and combinations thereof.

10. An electrochemical cell as in claim 3, wherein said layer of conductive polymer is polyaniline.

11. An electrochemical capacitor device comprising first and second electrodes, and an electrolyte disposed therebetween, each of said electrodes comprising a substrate fabricated from materials selected from the group consisting of titanium, stainless steel, nickel, aluminum, vanadium, niobium, tungsten, and combinations thereof, and wherein each said substrate has a nitride layer formed on a surface thereof, and further wherein a layer of an electrically conductive polymer is formed upon each said nitride layer.

12. An electrochemical capacitor as in claim 11, wherein said substrate is Ti.

13. An electrochemical capacitor as in claim 11, wherein said nitride layer is formed to a thickness of between 0 Å and 1 µm.

14. An electrochemical capacitor as in claim 11, wherein said layer of conductive polymer is a redox polymer.

15. An electrochemical capacitor as in claim 11, wherein said wherein said layer of conductive polymer is fabricated of a material selected from the group of polyaniline, polypyrrole, polyanisidene, polyparaphenylene, polythiophene, polyacetylene, polyfuran, polyazulene, polyindole, and combinations thereof.

16. An electrochemical capacitor as in claim 11, wherein said layer of conductive polymer is polyaniline.

* * * * *